US007003682B2

(12) United States Patent
Irazabal et al.

(10) Patent No.: US 7,003,682 B2
(45) Date of Patent: Feb. 21, 2006

(54) POWER MANAGEMENT METHOD FOR SETTING CLOCK CIRCUIT INTO POWER DOWN MODE IF ANALOG FRONT END CIRCUIT IS SAMPLING INPUT SIGNALS IN AN ELECTRONIC DEVICE

(75) Inventors: Jean-Marc Irazabal, Sunnyvale, CA (US); Calto Wong, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 236 days.

(21) Appl. No.: 09/908,036

(22) Filed: Jul. 17, 2001

(65) Prior Publication Data

US 2003/0016066 A1  Jan. 23, 2003

(51) Int. Cl.
*G06F 1/32* (2006.01)

(52) U.S. Cl. ...................................... 713/324; 713/322

(58) Field of Classification Search ................ 713/320, 713/322, 324
See application file for complete search history.

(56) References Cited

U.S. PATENT DOCUMENTS

| 4,980,836 A | * | 12/1990 | Carter et al. ................. 713/322 |
| 5,625,311 A | * | 4/1997 | Nakatsu ....................... 327/293 |
| 5,838,983 A | * | 11/1998 | Atkinson ..................... 713/322 |
| 6,412,075 B1 | * | 6/2002 | Klein ........................... 713/322 |
| 6,711,631 B1 | * | 3/2004 | Chan et al. ................... 710/14 |

* cited by examiner

*Primary Examiner*—Chun Cao

(57) ABSTRACT

In an electronic device, a first electronic circuit is selectively operated in a selected one of at least two operating modes. A second electronic circuit is selectively operated in a power-up mode and a power-down mode. The second electronic circuit is put into the power-down mode if the first electronic circuit is operated in one of the at least two operating modes.

13 Claims, 6 Drawing Sheets

| RESET | SYNC | | | | | | | SL | SR | PR ADCSR | SLPM DACSR | | CODEC | | | | | OSC | PLL | ACL |
|---|---|---|---|---|---|---|---|---|---|---|---|---|---|---|---|---|---|---|---|---|
| | | 0 | 1 | 2 | 3 | 4 | 5 | | | | | LEFT INPUT | RIGHT INPUT | MIC INPUT | OUTPUT STAGE | AUD VREF | | | |
| 0 | ↑EDGE | | | | | | | | | | | OFF | OFF | OFF | OFF | OFF | OFF | OFF | OFF |
| 1 | NO EDGE | | | | | 1 | | | | | | | | | | | ON | | |
| 1 | NO EDGE | | | | 1 | | | | | | | | | | | | OFF | OFF | OFF |
| 1 | | | | 1 | | | | | | | | | | | | | | | |
| 1 | | | 1 | | | | | | | | | | | | | | | | |
| 1 | | 1 | | | | | | | | | | | | | | | | | |
| 1 | | | | | | | | | | | | | | | OFF | OFF | | | |
| 1 | | | | | | | | | | | | OFF | OFF | | | | | | |
| 1 | | | | | | | | | | | 000 000 | ON | OFF | | | | | | |
| 1 | | | | | | | | | | | 000 100 | OFF | ON | ON | | | | | |
| 1 | | | | | | | | | | | 100 000 | OFF | OFF | ON | | | | | |
| 1 | | 0 | 0 | 0 | 0 | | | | 0 | | | ON | ON | OFF | | | | | |
| 1 | | 0 | 0 | 0 | 0 | | | | 1 | 100 | | ON | ON | OFF | ON | ON | | | |
| 1 | ↓EDGE | 1 | 0 | 0 | 0 | 1 | 1 | | 0 | | | | | ON | ON | ON | | | ON |
| 1 | ↓EDGE | 0 | 0 | 0 | 0 | 0 | 0 | | 0 | | | | | | | | | ON | |

FIG. 4A

|   |   |   |   |   |   |
|---|---|---|---|---|---|
| ON | ON | OFF | OFF | OFF | OFFF |
|   |   |   |   |   |   |
|   |   |   |   |   |   |
|   |   |   |   |   |   |
|   |   |   |   |   |   |
|   |   |   |   |   |   |
| m.11.025 kHz (m=1,2,4) | m.11.025 kHz (m=1,2,4) | n.8 kHz (n=1,2,4,6) |   | n.8 kHz (n=1,2,4,6) |   |
|   | n.8 kHz (n=1,2,4,6) | n.8 kHz (n=1,2,4,6) |   |   |   |
|   |   |   |   |   |   |
|   |   |   |   |   |   |
| 1 | 1 | 1 | 1 | 1 | 1 |
| 0 | 0 | 0 | 0 | 0 | 0 |
|   |   |   |   |   |   |
|   | 0 | 0 | 1 | 0 |   |
| 0 |   | 0 | 0 | 1 | 1 |
|   |   |   |   |   |   |
| 1 | 1 | 1 | 1 | 1 | 1 |

TABLE 50

FIG. 4B

POWER MANAGEMENT METHOD FOR SETTING CLOCK CIRCUIT INTO POWER DOWN MODE IF ANALOG FRONT END CIRCUIT IS SAMPLING INPUT SIGNALS IN AN ELECTRONIC DEVICE

BACKGROUND OF THE INVENTION

1. Field of the Invention

The present invention relates to an electronic device, particularly to power saving in a battery-operated electronic device. Such an electronic device can be a cell phone, a personal intelligent communicator, a personal digital assistant, a handheld PC, a palm-top PC, or any other suitable electronic device.

The present invention further relates to an integrated circuit for such an electronic device, particularly to an integrated circuit being an audio codec.

The present invention further relates to a method of operating an electronic device.

2. Description of the Related Art

Intel™'s AC '97 Component Specification, "Audio Codec '97", Revision 2.1, May 22, 1998, pp. 13–16, and 45–48 specifies a 16-bit full-duplex stereo audio codec (DAC and ADC) with line-level stereo inputs, a microphone input, and other inputs and outputs. As described on pages 13–15 of the AC '97 Specification, the audio sampling rate may be fixed or variable. On page 45 of the AC '97 Specification, in Table 19 powerdown control bits are shown controlling various power down modes in which blocks of the audio codec are powered down, such as input ADCs, outpout DACs, or the like. On pages 46 and 47 of the AC '97 Specification such low power modes are described in more detail.

More generally, selective powering down of circuit blocks, or running circuit blocks at reduced power, is well-known, in ICs, or in portable electronic devices using such ICs, such as cell phones, PDAs, or any other portable electronic device where there is a need to manage power consumption in order to extend battery life.

SUMMARY OF THE INVENTION

It is an object of the invention to provide a versatile, smart power management method taking into account operating modes of a device.

It is another object of the invention to provide such smarter power management in a battery operated electronic device.

In accordance with the invention, an electronic device is provided, said electronic device comprising:
 a first electronic circuit being operable in at least two operating modes;
 a second electronic circuit being operable in a power-up mode and a power-down mode, said electronic device being configured to put said second electronic circuit into said power-down mode if said first electronic circuit is operating in one of said at least two operating modes.

In an embodiment, the second electronic circuit may be part of the first electronic circuit. In one application thereof, the electronic device is an audio codec, the first electronic circuit being an analog front end selectively sampling one of a plurality of input signals, and the second electronic circuit being a currently non-selected input channel or currently being unused input channels.

In another embodiment, the first and second electronic circuits may be separate circuits. In one application thereof, the electronic device is an audio codec, the first electronic circuit being an analog front end selectively sampling one of a plurality of input signals, and the second electronic circuit being a second and separate clock means including a phase-locked loop circuit that is powered down when not in use because another clock means, ADC clock means such as a crystal clock, is performing sampling. In such an application, further powering-down means may be provided to power down currently unselected input channels of the analog front end.

Generally, the invention may be used for conditional powering down of circuit blocks upon an operating condition in another circuit block or software block, i.e., smart power management. Other applications can include a VCR wherein power to a recording part is shut down when the VCR is in play back mode, or a cell phone that is in receive-only mode, e.g. only receiving caller identification information, wherein in such only-receiving mode power to a transmit part is shot down.

Preferably, smart power modes are set by means of power bits in a register. At one setting of the smart power bits, smart powering down is de-activated so that other power down strategies, such as independent and separate powering down of circuit blocks can be done. Preferably, the smart power bits are set by a user of the electronic device, smart power control then further being done automatically.

BRIEF DESCRIPTION OF THE DRAWING

FIG. 4 is a table showing power up/down modes in an audio codec application according to the invention.

Throughout the figures the same reference numerals are used for the same features.

DESCRIPTION OF THE DETAILED EMBODIMENTS

Figure 1:
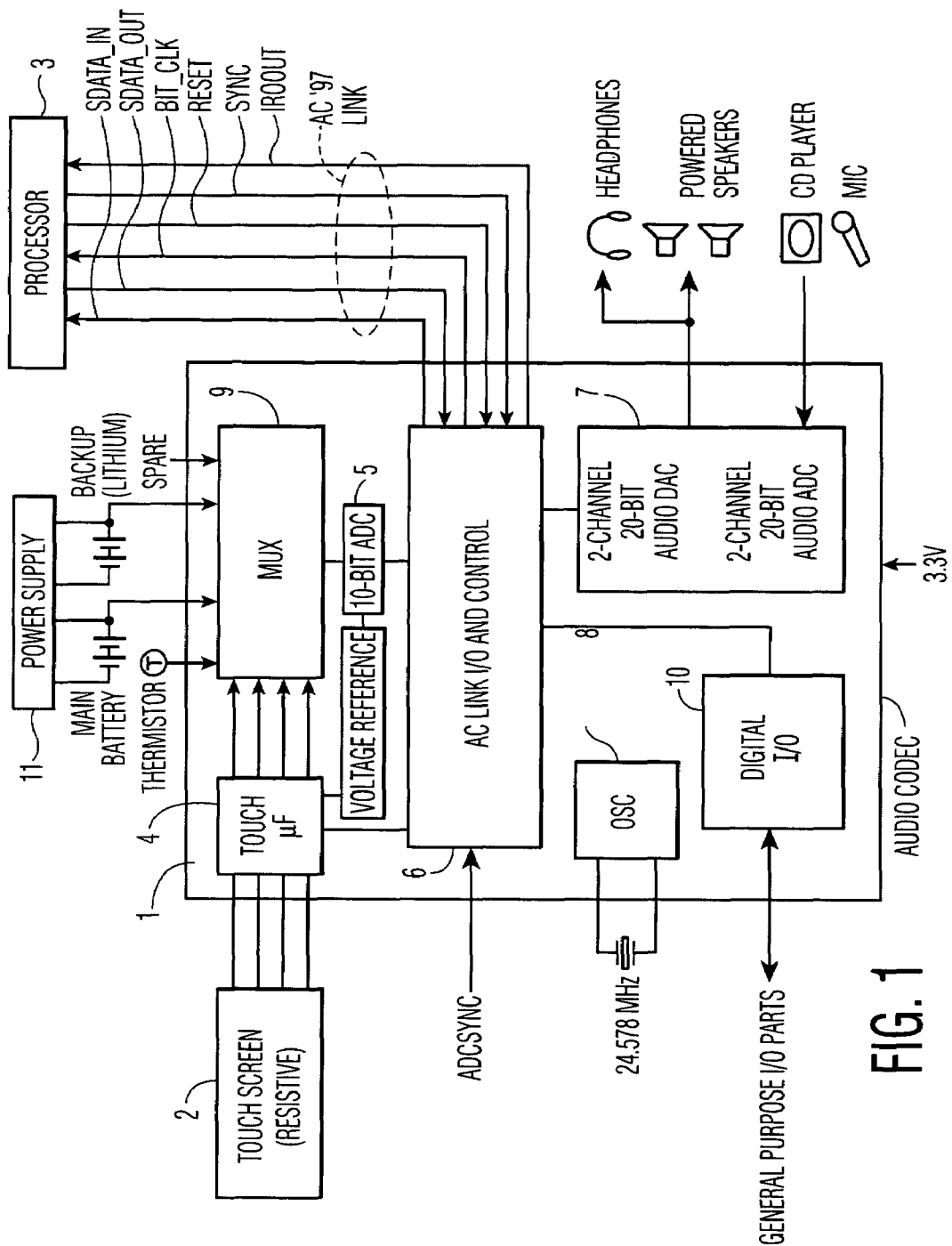
FIG. 1 is block diagram of an audio codec according to the invention, in an application with a touch screen and an AC '97 link to an external processor.

FIG. 1 is block diagram of an audio codec 1 according to the invention, with a touch screen interface, in an application with a touch screen 2 and an AC '97 link to an external processor 3. AC '97 link implements a digital serial interface protocol, and is in compliance with said Intel™'s AC '97 Component Specification. AC '97 link is a bi-directional, fixed rate, serial PCM digital stream. It handles multiple input and output audio and modem streams, as well as control register accesses employing a time division multiplexed scheme, SDATA_IN, SDATA_OUT, and uses link control signals BIT_CLK and SYNC. Further shown are signals RESET and IRQOUT. Audio codec 1 comprises a touch screen interface 4, a 10-bit ADC 5, an AC link I/O and control block 6, 2-channel 20-bit audio DAC and ADC 7 providing analog output signals to such devices as headphones and powered speakers, and, at a variable rate, sampling signals from devices such as CD-players and microphones. Audio codec 1 further comprises a crystal controlled oscillator 8, a multiplexer 9, and a general purpose digital I/O interface 10. Further shown is a power supply 11.

Figure 2:
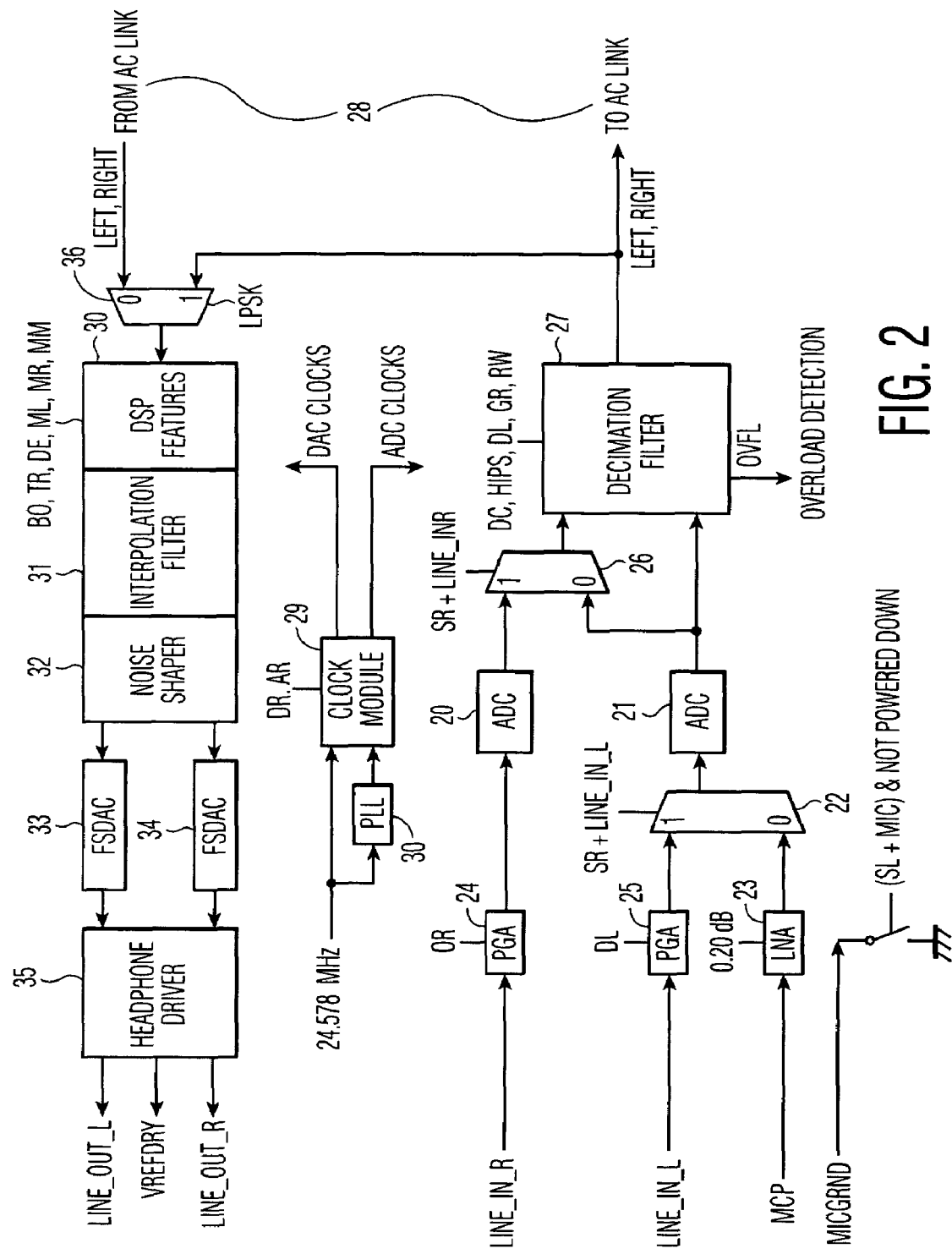
FIG. 2 is a more detailed block diagram of an audio codec according to the invention.

FIG. 2 is a more detailed block diagram of audio codec 1, particularly showing a 2-channel audio front end with analog-to-digital converters 20 and 21. If a stereo line input signal is present at left and right line inputs LINE_IN_R and LINE_IN_R, through proper setting of selector 22, ADCs 20 and 21 sample such a stereo line input signal. Then, applying smart powering down according to the invention when activated, low noise microphone amplifier 23 is powered down. In microphone-only mode, programmable gain right and left line input amplifiers 24 and 25, and right channel ADC 20 are powered down. In one line-in and one microphone mode, left line input amplifier 25 is powered down. So, smart powering down in the audio front end is performed depending on operating modes of the audio front end. The audio front end further comprises a multiplexer 26 and a decimation filter 27 through which it is coupled to AC' 97 link 28. In microphone mode, a mono microphone signal can be sent to both left and right inputs of decimation filter 27.

Audio codec 1 further comprises crystal controlled clock module 29 for generating DAC and ADC clocks, and phase-locked loop (PLL) 30. This clock mechanism supports a variable audio sample rate. The audio sample rate is derived from a 24.576 MHz crystal clock for 8, 16, 32, and 48 kHz sample rates, and from PLL 30 for 11.025, 22.05, and 44.1 kHz sample rates. Applying smart powering down according to the invention when activated, PLL 30 is powered down for sample rate settings of 8, 16, 32, and 48 kHz, and is powered up for sample rate settings of 11.025, 22.05, and 44.1 kHz and the corresponding audio DAC or ADC is not in power-down mode. In normal operating mode, all audio front end blocks and PLL 30 are on, and usual AC '97 power management bits, so-called PR bits (PR0, PR1, ..., PR5) as defined in the AC' 97 Specification, may still be set. E.g., PR0 bit set powers down all blocks in the audio front end which is not smart power management taking into account various operating modes of the audio front end. In normal operating mode, smart power control is de-activated. Activating and de-activating smart power mode is preferably done under user control.

Audio codec 1 further comprises an output channel with digital sound processing features such a tone/bass/treble settings and de-emphasis control, an interpolation filter 31, a noise shaper 32, filter stream DACs 33 and 34, and a headphone driver 35. A multiplexer 36 is provided for loop back codec testing without using AC link 28. In normal operating mode, with usual power management as with said PRO and PR1 bits, audio input and output paths can be powered down independently.

Figure 3:
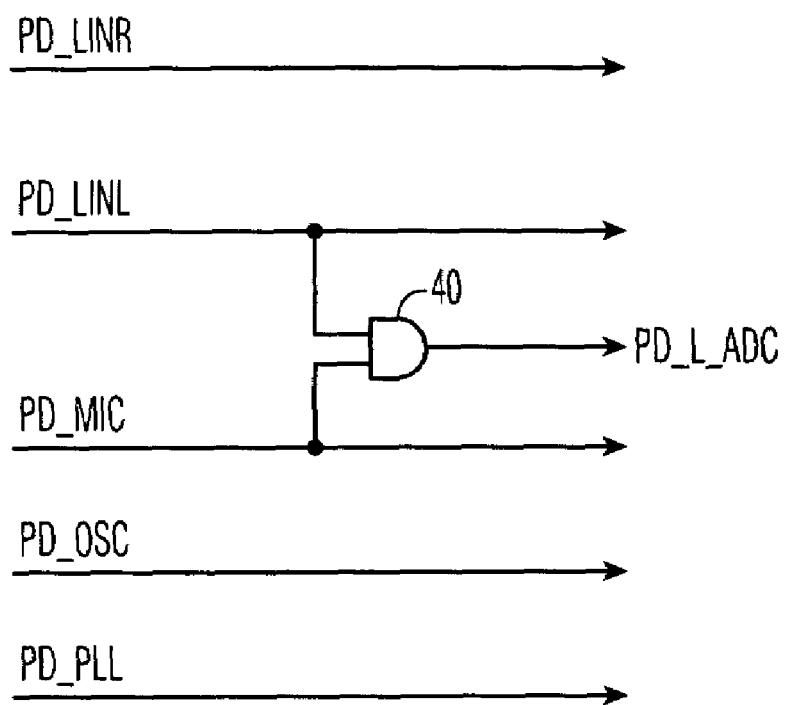
FIG. 3 shows power down signals for an audio codec according to the invention.

FIG. 3 shows power down signals for audio codec 1. At given operating modes, as described, power down signals PD_LINR, PD_LINL, PD_MIC, PD_OSC, and PD_PLL are respectively supplied to amplifier 24 and ADC 20, to amplifier 25, to microphone amplifier 23, to crystal oscillator 8, and to PLL 30. Power down signal PD_L_ADC is an output signal of AND-gate 40 to which power down signals PD_LINL and PD_MIC are inputted. Power down signal PD L_ADC is supplied to ADC 21.

FIG. 4 is a table 50 showing power up/down modes in audio codec 1. Table 50 shows usual power management bits PR0, PR1, PR2, PR3, PR4, and PR5, and smart low power mode bits SLPM0 and SLPM1. If SLPM1=0 and SLPM0=0, smart power management is de-activated. If SLPM1=0 and SLPM1=1, smart low power mode is active for the audio front end, only used audio front ends then being active. If SLPM1=1 and SLPM0=0, smart low power mode is active for the PLL only. Then, if either one of the audio DACs or ADCs is not in power down mode, PLL 30 is only powered up for audio sampling rates of 11.025, 22.05, and 44.1 kHz. If SLPM1=1 and SLPM0=1, smart low power mode is active for both the audio front end and the PLL. Table 50 further shows AC' 97 link signals RESET and SYNC, and other power management bits and bit settings, also for 10-bit ADC 5, touch screen 2, and AC link ACL, such other power management being conventional.

Figure 5:
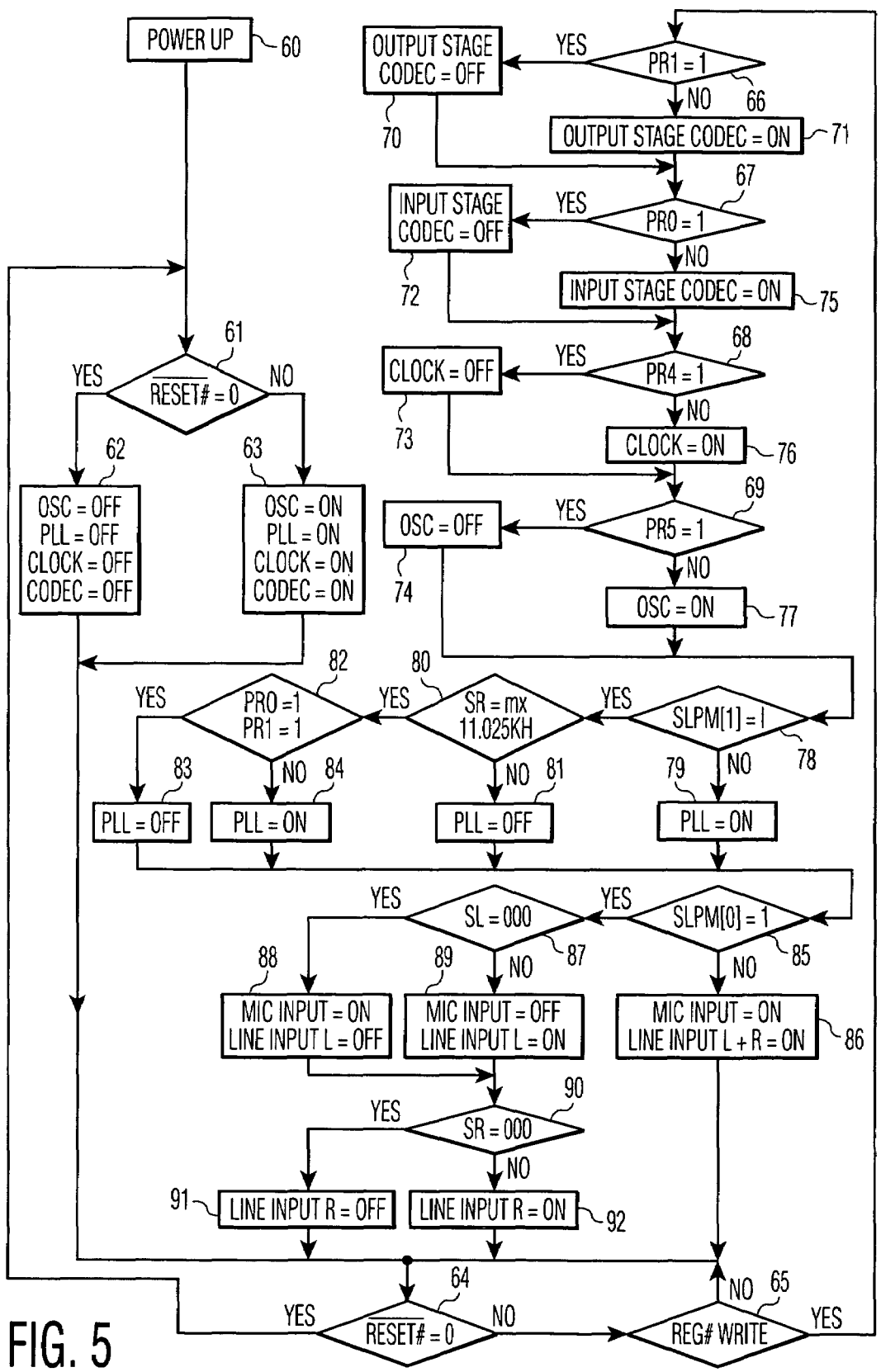
FIG. 5 is a flow chart illustrating powering up and down in an audio codec application according to the invention.

FIG. 5 is a flow chart further illustrating powering up and down in an audio codec application according to the invention. In block 60, audio codec 1 is powered up. RESET is tested in block 61. If a reset condition is true, in block 62, oscillator 8, PLL 30, the AC link clock, and codecs are switched off. Otherwise normal operating mode is adopted, in block 63, oscillator 8, PLL 30, the AC link clock, and codecs being switched on. In block 64, RESET is again tested. Distinguished are cold and warm reset, cold reset, at which all logic and registers are initialized to default settings, being initiated by bringing notRESET low for at least 1 μsec, and warm reset, at which the contents of all registers are left unaltered, being initiated by bringing SYNC high for at least 1 psec without BIT_CLK. If no RESET in block 64, and no register reset as tested in block 65, usual power management bits PR1, PR0, PR4, and PR5 are respectively tested in test blocks 66, 67, 68, and 69. If PR1=1, in block 70 the output stage codec, i.e., 2-channel 20-bit audio DAC shown in FIG. 1, is switched off. If PR1=0, in block 71 the output stage codec is switched on. Similarly, in blocks 72, 73, and 74, the input stage codec, the AC link clock, and oscillator 8 are switched on, respectively, and in blocks 75, 76, and 77, the input stage codec, the AC link clock, and oscillator 8 are switched off, respectively.

In block 78, smart power bit SLPM1 is tested. If not set, in block 79 PLL 30 is switched on. If SLPM1=1, i.e., is set, in block 80 it is tested whether the audio sampling rate is a multiple of 11.025 kHz. It not true, in block 81 PLL 30 is switched off. If true, in block 82 it is tested whether both PR0 and PR1 are set, i.e., whether both input and output stage codec are switched off. If true, in block 83 PLL 30 is switched off. If not true, in block 84 PLL 30 is switched on.

In block 85, smart power bit SLPMO is tested. If not set, in block 86, the audio front end, i.e., amplifiers 23, 24, and 26, and ADCs 20 and 21, are powered up. If SLPM0=1, in block 87 it is tested whether the left line input is inactive. If true, in block 88, microphone amplifier 23 is powered down and line input amplifier 25 is powered up. If not true, in block 89 microphone amplifier 23 is powered up and line input amplifier 25 is powered down. Then, in block 90 it is tested whether the right line input is inactive. If true, in block 91 line input amplifier 24 and ADC 20 are powered down. If not true, in block 92 line input amplifier 24 and ADC 20 are powered up.

The invention has been described as regards an audio codec and an audio codec application. The invention can also be applied to other electronic devices and applications. One other use of the invention is applying smart low power mode to a VCR. When such a VCR is in playback mode, thereby applying smart low power mode as described, its recording circuits are powered down. Another use of the invention is applying smart low power mode to a battery operated phone. When such a phone is in receive-only functional mode, e.g. when being in a caller-ID reception mode, thereby applying smart low power mode as described, its transmit circuits are switched off.

The invention has been described with powering down based upon operation of hardware blocks, bit settings in registers and/or state machines. Alternatively, powering down according to the invention can be based on a combination of hardware blocks and a programmed machine (software), thereby implementing the described functionality.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. An electronic device comprising:
   a first electronic circuit being operable in at least two operating modes;
   a second electronic circuit being operable in a power-up mode and a power-down mode, said electronic device being configured to put said second electronic circuit into said power-down mode if said first electronic circuit is operating in one of said at least two operating modes;
   wherein said first electronic circuit comprises an analog front end for selectively sampling a selected one of a plurality of input signals, and a first operating mode of said at least two operating modes includes sampling with a first clock means; and
   wherein said second electronic circuit is a second clock means;
   a second operating mode of sad at least two operating modes including sampling with said second clock means; and
   in said first operating mode said electronic device, putting said second electronic circuit into said power-down mode.

2. An electronic device as claimed in claim 1, further comprising a register comprising at least one power control bit, at a first setting of said at least one power control bit said power-up and power-down operation being de-activated.

3. An electronic device as claimed in claim 2, further comprising power control means for separately controlling power-up and power-down of said first and second electronic circuits, said further power control means being active at said first setting.

4. An electronic device as claimed in claim 2, said power-up and power-down operation being activated at least at a second setting of said at least one power control bit.

5. An electronic device as claimed in claim 4, wherein said first and second settings are settable by a user of said electronic device.

6. An electronic device as claimed in claim 1, wherein said second electronic circuit is a part of said first electronic circuit that corresponds to analog front end circuitry associated with non-selected ones of said plurality of input signals.

7. An electronic device as claimed in claim 1, further comprising powering-down means for powering-down analog front end circuitry in said analog front end associated with non-selected ones of said plurality of input signals.

8. An electronic device as claimed in claim 1, wherein said second clock means includes a phase-locked loop circuit.

9. An electronic device as claimed in claim 1, said electronic device being a battery-operated device.

10. An integrated circuit for an electronic device, said integrated circuit comprising:
    a first electronic circuit being operable in at least two operating modes;
    a second electronic circuit being operable in a power-up mode and a power-down mode, said second electronic circuit being operated into said power-down mode if said first electronic circuit is operating in one of said at least two operating modes;
    wherein said first electronic circuit comprises an analog front end for selectively sampling a selected one of a plurality of input signals, and a first operating mode of said at least two operating modes includes sampling with a first clock means; and
    wherein said second electronic circuit is a second clock means;
    a second operating mode of said at least two operating modes including sampling with said second clock means; and
    in said first operating mode said electronic device, putting said second electronic circuit into said power-down mode.

11. An integrated circuit as claimed in claim 10, wherein said second electronic circuit is a part of said first electronic circuit that corresponds to analog front end circuitry associated with non-selected ones of said plurality of input signals.

12. An integrated circuit as claimed in claim 10, further comprising powering-down means for powering-down analog front end circuitry in said analog front end associated with non-selected ones of said plurality of input signals.

13. A method of operating an electronic device, said method comprising:
    selectively operating a first electronic circuit in a selected one of at least two operating modes;
    selectively operating a second electronic circuit in a power-up mode and a power-down mode; and
    putting said second electronic circuit into said power-down mode if said first electronic circuit is operated in one of said selected ones of said at least two operating modes;
    wherein said first electronic circuit comprises an analog front end for selectively sampling a selected one of a plurality of input signals, and a first operating mode of said at least two operating modes includes sampling with a first clock means; and
    wherein said second electronic circuit is a second clock means;
    sampling with said second clock means in a second operating mode of said at least two operating modes; and
    in said first operating mode said electronic device, putting said second electronic circuit into said power-down mode.

* * * * *